United States Patent
Mendelson et al.

(10) Patent No.: US 11,263,150 B2
(45) Date of Patent: Mar. 1, 2022

(54) TESTING ADDRESS TRANSLATION CACHE

(71) Applicant: International Business Machines Corporation, Armonk, NY (US)

(72) Inventors: Hillel Mendelson, Kibutz Hahotrim (IL); Tom Kolan, Haifa (IL); Vitali Sokhin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/787,080

(22) Filed: Feb. 11, 2020

(65) Prior Publication Data
US 2021/0248084 A1    Aug. 12, 2021

(51) Int. Cl.
*G06F 12/00*  (2006.01)
*G06F 12/1045* (2016.01)
*G06N 5/00* (2006.01)

(52) U.S. Cl.
CPC ......... *G06F 12/1045* (2013.01); *G06N 5/003* (2013.01)

(58) Field of Classification Search
CPC ............................ G06F 12/1045; G06N 5/003
See application file for complete search history.

(56) References Cited

U.S. PATENT DOCUMENTS

| | | | | |
|---|---|---|---|---|
| 4,667,288 A * | 5/1987 | Keeley | .................. | G06F 11/073 711/E12.075 |
| 5,355,471 A * | 10/1994 | Weight | .................... | G06F 11/22 714/10 |
| 8,825,984 B1 * | 9/2014 | Srinivasan | ............ | G06F 12/109 711/206 |
| 9,684,606 B2 | 6/2017 | Kessler et al. | | |
| 9,715,459 B2 | 7/2017 | Guthrie et al. | | |
| 10,169,234 B2 | 1/2019 | Friedmann et al. | | |
| 10,282,305 B2 | 5/2019 | Borntraeger et al. | | |
| 2006/0206686 A1 * | 9/2006 | Banerjee | ............. | G06F 12/1027 711/205 |

OTHER PUBLICATIONS

A Survey of Techniques for Architecting TLBs.

* cited by examiner

*Primary Examiner* — Gurtej Bansal
(74) *Attorney, Agent, or Firm* — Ziv Glazberg (57) ABSTRACT

A method, apparatus and product for utilizing address translation structures for testing address translation cache. The method comprises: obtaining a first address translation structure that comprises multiple levels, including a first top level which connects a sub-structure of the first address translation structure using pointers thereto; determining, based on the first address translation structure, a second address translation structure, wherein the second address translation structure comprises a second top level that is determined based on the first top level, wherein the second top level connects the sub-structure of the first address translation structure; executing a test so as to verify operation of an address translation cache of a target processor at least by: adding a plurality of cache lines to the address translation cache, wherein said adding is based on the address translation structures; and verifying the operation of the address translation cache using one or more memory access operations.

20 Claims, 6 Drawing Sheets

TESTING ADDRESS TRANSLATION CACHE

TECHNICAL FIELD

The present disclosure relates to quality assurance in general, and to verification of operation of processors while an address translation cache is full, in particular.

BACKGROUND

Computerized devices control almost every aspect of our life—from writing documents to controlling traffic lights. However, computerized devices are bug-prone, and thus require a testing phase in which the bugs should be discovered. The testing phase, also referred to as verification phase, is considered one of the most difficult tasks in designing a computerized device. The cost of a bug may be enormous, as its consequences may be disastrous. For example, a bug may cause the injury of a person relying on the designated functionality of the computerized device. Additionally, a bug in hardware or firmware may be expensive to fix, as patching it requires call-back of the computerized device. Hence, many developers of computerized devices invest a significant portion, such as 70%, of the development cycle to discover erroneous functionalities of the computerized device.

BRIEF SUMMARY

One exemplary embodiment of the disclosed subject matter is a method comprising: obtaining a first address translation structure, wherein the first address translation structure comprises multiple levels, each of which comprising one or more entries that point to a next level in the first address translation structure, wherein the multiple levels comprises a first top level which connects a sub-structure of the first address translation structure using pointers thereto, wherein the first address translation structure enables translation of virtual addresses to physical addresses; determining, based on the first address translation structure, a second address translation structure, wherein the second address translation structure comprises a second top level that is determined based on the first top level, wherein the second top level connects the sub-structure of the first address translation structure, wherein the second address translation structure enables translation of virtual addresses to physical addresses; executing a test by a target processor, wherein the test is configured to verify operation of an address translation cache of the target processor, wherein said executing comprises: adding a plurality of cache lines to the address translation cache, wherein said adding is based on the first address translation structure and the second address translation structure, wherein the plurality of cache lines, wherein at least one cache line of the plurality of cache lines is determined based on a translation by the first address translation structure, wherein at least one cache line of the plurality of cache lines is determined based on a translation by the second address translation structure; and verifying the operation of the address translation cache using one or more memory access operations.

Another exemplary embodiment of the disclosed subject matter is a computerized apparatus having a processor and coupled memory, the processor being adapted to perform the steps of: obtaining a first address translation structure, wherein the first address translation structure comprises multiple levels, each of which comprising one or more entries that point to a next level in the first address translation structure, wherein the multiple levels comprises a first top level which connects a sub-structure of the first address translation structure using pointers thereto, wherein the first address translation structure enables translation of virtual addresses to physical addresses; determining, based on the first address translation structure, a second address translation structure, wherein the second address translation structure comprises a second top level that is determined based on the first top level, wherein the second top level connects the sub-structure of the first address translation structure, wherein the second address translation structure enables translation of virtual addresses to physical addresses; executing a test by a target processor, wherein the test is configured to verify operation of an address translation cache of the target processor, wherein said executing comprises: adding a plurality of cache lines to the address translation cache, wherein said adding is based on the first address translation structure and the second address translation structure, wherein the plurality of cache lines, wherein at least one cache line of the plurality of cache lines is determined based on a translation by the first address translation structure, wherein at least one cache line of the plurality of cache lines is determined based on a translation by the second address translation structure; and verifying the operation of the address translation cache using one or more memory access operations.

Yet another exemplary embodiment of the disclosed subject matter is a non-transitory computer readable medium retaining program instructions, which program instructions when read by a processor, cause the processor to perform: obtaining a first address translation structure, wherein the first address translation structure comprises multiple levels, each of which comprising one or more entries that point to a next level in the first address translation structure, wherein the multiple levels comprises a first top level which connects a sub-structure of the first address translation structure using pointers thereto, wherein the first address translation structure enables translation of virtual addresses to physical addresses; determining, based on the first address translation structure, a second address translation structure, wherein the second address translation structure comprises a second top level that is determined based on the first top level, wherein the second top level connects the sub-structure of the first address translation structure, wherein the second address translation structure enables translation of virtual addresses to physical addresses; executing a test by a target processor, wherein the test is configured to verify operation of an address translation cache of the target processor, wherein said executing comprises: adding a plurality of cache lines to the address translation cache, wherein said adding is based on the first address translation structure and the second address translation structure, wherein the plurality of cache lines, wherein at least one cache line of the plurality of cache lines is determined based on a translation by the first address translation structure, wherein at least one cache line of the plurality of cache lines is determined based on a translation by the second address translation structure; and verifying the operation of the address translation cache using one or more memory access operations.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to verify a target processor. The target processor may be a general-purposes processor, a special-purpose processor, a Central Processing Unit (CPU), an Integrated Circuit (IC), a Graphics Processing Unit (GPU), or the like. More specifically, the technical problem may be to verify that the target processor is exhibiting expected and correct behavior regarding management of address translation caches.

In some exemplary embodiments, verifying a target processor may comprise simulation or execution of many test-cases, also referred to as tests. In some cases, the test may be executed using a simulator of the design of the target processor, such as in case the target processor is not yet fabricated (also referred to as pre-silicon verification). Additionally or alternatively, the test may be executed on the target processor itself (also referred to as post-silicon verification).

In some exemplary embodiments, a context change may refer to a functionality of the target processor. The target processor may be configured to utilize different address translation structures in different contexts. A translation structure may be a table, a tree, or the like. For example, when attempting to access a virtual address in a first context, a first translation structure may be utilized to determine the corresponding physical address. However, if the same virtual address is accessed in a second context, the processor may be configured to utilize a second translation structure to determine the correct physical address in that context. In some exemplary embodiments, context switching of the target processor may be the process in which the target processor changes the translation structure that it utilizes for translating virtual addresses.

In some exemplary embodiments, each context may be associated with a different translation structure. The translation structure may define a mapping of a set of virtual addresses to a set of physical addresses. During execution of a process, whenever a memory is accessed using a virtual address, the virtual address may be translated into physical address. In order to fetch a physical address based on a virtual address, the target processor may be configured to first access an address translation cache. The address translation cache may utilize a dictionary data structure. A key may comprise a virtual address, a context unique identifier, or the like. A value of the dictionary may be a physical address. In case that the address translation cache comprises the virtual address as a key, the associated physical address may be fetched therefrom (also referred to as a cache hit). Additionally or alternatively, in case that the address translation cache is not comprising the virtual address, not comprising the virtual address and a current context ID (also referred to as a cache miss), the physical address may be calculated using an address translation structure. In case of a cache miss, the address translation cache may be updated to include the virtual address and the calculated physical address. Additionally or alternatively, in case the cache was already full, in order to add an entry to the address translation cache, a pre-existing entry may be removed from the address translation cache. In some exemplary embodiments, the address translation cache may be implemented as a Translation Lookaside Buffer (TLB). The memory may be accessed as part of a memory access instruction, e.g., loading or storing information, as part of control flow operation, e.g., based on the instruction pointed to by the address that is stored in the program counter (also referred to as an instruction pointer).

Another technical problem dealt with by the disclosed subject matter is to accelerate the verification process while executing extensive and thorough tests. Additionally or alternatively, preparing an operating system for executing an executable may be a time consuming task. It may comprise validating permissions, loading the content of the executable to memory, copying command line arguments to the stack, creating a set of virtual addresses, determining an address translation structure, or the like. In some exemplary embodiments, it may be desired to test the operation of context changes of the target processor without loading thereon a full-fledged Operating System (OS).

Yet another technical problem dealt with by the disclosed subject matter is to generate as many contexts as possible, as fast as possible at each test. In some exemplary embodiments, in order to execute an extensive and thorough test, it may be desired to include in the test generation of multiple contexts. Each context may have an associated address translation structure. It may be desired that each address translation structure that is generated while generating a context comprises entries with non-null values. In some exemplary embodiments, a newly generated context may comprise an address translation structure having null values. It may be desired that entries comprise by the newly generated address translation structure shall comprise real values. Real values may be values that a target processor may be able to utilize in order to translate a virtual address to physical address.

One technical solution is to obtain a first address translation structure. Based on the first address translation structure, a second address translation structure may be determined. The first address translation structure and the second address translation structure may be utilized by a target processor in order to translate virtual address to physical address in a first and a second context, respectively. In some exemplary embodiments, a test may be executed in order to verify that an address translation cache of a target processor is operating as defined. Executing the test may comprise adding a plurality of cache lines to the address translation cache. In some exemplary embodiments, at least one cache line may be determined based on the first address translation structure and at least one cache line may be determined by the second address translation structure. Additionally or alternatively, the test may comprise memory access operations such as read, write, or the like in order to access physical addresses via virtual address based on the address translation cache.

In some exemplary embodiments, the first address translation structure may be utilized by a target processor in order to translate virtual addresses to physical addresses in a first context. In some exemplary embodiments, the first address translation structure may comprise multiple levels. Each level may comprise at least one entry. Each entry may point to another level, such as a next level, in the first address translation structure. In some exemplary embodiments, the first address translation structure may comprise a first top level. The first top level may comprise pointers, each of which may point to another level. The pointers may connect the first top level to a sub translation structure of the first address translation structure. Additionally or alternatively, each level comprised by the sub translation structure may comprise pointers pointing to a next level comprised by the sub-structure.

In some exemplary embodiments, the second address translation structure may comprise the sub-structure of the first address translation structure by connecting the top level of the second address translation structure to the first sub-structure. Connecting the top level of second address translation structure to the sub-structure may be utilized by using at least one pointer, pointing to the sub-structure. In some exemplary embodiments, the top level of the second address translation structure may be referred to as a modified top level as the top level of the first address translation structure is modified in order to determine the second address translation structure.

In some exemplary embodiments, an address translation cache may be utilized by a target processor in order to rapidly fetch a physical address based on a virtual address. In some exemplary embodiments, accessing the first address translation structure, the second address translation structure, or the like, and computing physical addresses based on a translation path therein, may be time consuming. The cache address translation cache may comprise a dictionary in which the virtual addresses are the keys and the physical addresses are the values. The target processor may be configured to retrieve a physical address from the address translation cache based on a virtual address. In case that the address translation cache does not comprise the desired virtual address, the target processor may be configured to fetch the physical address from the first address translation structure, from the second address translation structure or the like. In some exemplary embodiments, in case that the target processor is executing instructions in a first context, a missing virtual/physical tuple may be computed based on a translation path in the first address translation structure. In some exemplary embodiments, the address translation structure may be configured to have a tuple of virtual address and a context ID as a key. In that case, the target processor may be configured to retrieve a physical address based on a virtual address and based on the current unique identification of the current executed context.

In some exemplary embodiments, executing a test may comprise adding lines to the address translation cache. Each line may comprise a virtual address, a context ID and a physical address. At least one line may be added based on the first address translation structure and at least one line may be added based on the second address translation structure. As an example, a line added based on the first address translation structure may comprise 0x11111111 as the virtual address, "1" as the context ID and 0x9999999 as the physical address. In some exemplary embodiments, a plurality of lines may be added to the address translation cache in order to fill it. Additionally or alternatively, a line may be added to the address translation cache as a side effect of executing an instruction in the test. As an example, a line may be added to the address translation cache in case that the test comprises accessing a memory location for which the associated virtual address is not in the address translation cache.

In some exemplary embodiments, executing the test may comprise performing memory access operations in order to verify the operation of the address translation cache. As an example, a virtual address not comprised by the address translation cache may be accessed, while the address translation cache is full. As a result of the cache miss, the physical address may be computed based on a translation path in an address translation structure based on the virtual address. The virtual and physical addresses may be stored in the address translation cache and a previously stored entry may be removed therefrom. After the cache mechanism is updated, the physical address may be utilized by the target processor. For example, the value stored in physical address may be load, as the target processor is instructed by a memory access operation. In some exemplary embodiments, it may be verified that the loaded value is as expected. In some exemplary embodiments, additional accesses to the same virtual address in the same context may be performed, relying on cache hits, instead of manual computations. In some cases, additional accesses to the same virtual address in different context may be performed to ensure correct operation of the cache mechanism—avoiding utilizing the cache entry relating to a different context.

In some exemplary embodiments, an address translation structure may comprise a top level and a sub translation structure. Determining the second address translation structure may comprise defining a second top level of the second address translation structure so as to connect to the sub translation structure of the first address translation structure. The second top level may be obtained by duplicating the first top level. In that embodiment, a top level of a translation structure may comprise at least one pointer. The pointer may point to a next level in the address translation structure. The next level may comprise a table of address, which may be utilized in the translation of a virtual address to a physical address. In that embodiment, a top level may comprise a plurality of pointers, each of which may point to a different next level, to the same next level, or the like. Each pointer may have a value. The value may be an address. The address may be an address of a next level in the sub translation structure. Each next level may comprise a table of address. Additionally or alternatively, each next level may comprise a table of segments of virtual addresses, a table of offsets of virtual addresses or the like.

In some exemplary embodiments, a top level of the first address translation structure may consist exactly one pointer. The one pointer may point to a sub-structure of the first address translation structure. In such an embodiment, determining a second address translation structure may comprise duplicating the single pointer. The second address translation may comprise a second top level consisting exactly one pointer—a second single pointer. A value of the single pointer may be copied to the second single pointer. As a result, both pointers may point to the same sub-structure of the first address translation structure.

It is noted that in some cases, the processor's architecture may dictate whether or not a top level pointer consisting of a single pointer can be duplicated. In some cases, the architecture prevents having two different contexts point to the same address representing a complete address translation structure. Put differently, two different root nodes may not point to a shared sub translation structure in such architectures. In such architectures, a higher level in the translation structure, such as the L1 level, may be duplicated, instead of duplicating the root node.

In some exemplary embodiments, duplicating the first top level to obtain the second top level may comprise assigning values to each pointer comprised by the second top level. For each pointer, a value address of a corresponding source pointer in the first top level, may be assigned thereto. The source pointer may be a pointer comprised by the first top level of the first address translation structure. As an example, if the first top level comprises ten (10) pointers, the second top level may comprise duplicates of the same ten pointers, having the same values, and therefore pointing to the same locations in the memory.

In some exemplary embodiments, the first address translation structure may be associated with a first set of attributes. The first set of attributes may comprise access permissions, valid bits, references bits, cache bits, or the like. Determining a second address translation structure may comprise determining a second set of attributes. Determining the second set of attributes may comprise duplicating the first of attributes to form the second set of attributes and changing at least one attribute comprised by the second set of attributes. Additionally or alternatively, determining the second address translation structure may comprise determining a different set of attributes than the first set of attributes. A different set of attributes may be different by at least one attribute relating to a virtual address. By changing an attribute it may be possible to cause an exception in the changed context and having the current context to resume without having the exception. As an example, the test template may comprise a set of directives that when executed by the target processor will cause an exception in a store operation. The exception may be accomplished by depriving from the first context a write permission to a virtual address. Additionally or alternatively, the exception may be accomplished by generating a test template that comprises a directive that when translated to a second set of instruction comprises a store instruction to the virtual address. On the other hand, the second context may execute the same set of instructions as the first context. Additionally or alternatively, the second may have a writing permission. Hence, while executing the second context the exception may not occur.

In some exemplary embodiments, the address translation structure may be determined using a Constraint Satisfaction Problem (CSP). A CSP defining the complex relationships between different portions of the address translation structure may be defined and solved by a CSP solver. In some exemplary embodiments, solving the CSP may be a computationally hard task, as such problem may be NP complete or even NP hard. In some exemplary embodiments, in real-life examples, it may take the CSP solver several hours, days, or the like, to solve such CSP. Hence, determination of each address translation structure in such manner may take significant amounts of time and computational resources. In some exemplary embodiments, the determination of the second address translation structure may be performed in a rapid manner, and without performing computational intensive tasks such as solving a CSP.

In some exemplary embodiments, the test may retained by an executable representation, also referred to as an executable. The executable may by a program product, a software, or the like that is compiled based on the instruction set of the target processor. The executable may comprise instructions that a target processor is configured to execute. Additionally or alternatively, the executable may comprise a test template defining an outline of the test to be executed, which may be generated on the fly. The executable may retain the first address translation structure, which may have been generated based on the solution of the CSP. Determining the second address translation structure may be performed during the execution of the executable. The executable may provide an expandable representation of the first address translation structure, to the second address translation structure, to a plurality of address translation structures, or the like. By utilizing the disclosed subject matter, the first address translation structure may be expanded to a plurality of address translation structures by duplicating the highest possible level of the first address translation structure and connecting the duplicated highest level to a sub-structure of the first address translation structure. Such expansion may be significantly faster compared to the usage of a CSP solver, and may avoid the need to enlarge the size of the executable by including multiple address translation structures in explicit manner.

One technical effect of utilizing the disclosed subject matter is to provide high-quality verification of a target processor. The disclosed subject matter may be utilized to ensure that utilizing an address translation cache by a target processor is tested. By utilizing a fast generation of address translation structures, it may be possible to rapidly generate context. As a result, bugs in utilizing the address translation cache performed by the target processor may be discovered.

In some exemplary embodiments, such verification may test the Memory Management Unit (MMU) of the target processor, the operation of the address translation cache mechanism of the target processor, or the like. In some exemplary embodiments, the disclosed subject matter may be useful for testing and verifying correctness of the operation of the TLB of the MMU of the target processor. In some exemplary embodiments, the TLB may be a cache that is used to reduce the time taken to access a user memory location, such as by caching recent address translation outcomes. In some exemplary embodiments, the TLB may store the recent translations of virtual memory to physical memory and may function as an address-translation cache. A TLB may reside between the CPU and the CPU cache, between CPU cache and the main memory or between the different levels of the multi-level cache. It is noted that TLB may be present in any processor that utilizes paged or segmented virtual memory.

Another technical effect of utilizing the disclosed subject matter is that the verification process of a context changing by the target processor may be faster and more efficient verification process. By utilizing the disclosed subject matter, a small executable capable of executing a large number of tests may be used in order to verify a target processor. In some exemplary embodiments, executing a test in accordance with the disclosed subject matter may take advantage of the fast generation of address translation structures to examine inconsistency in the operation of the target processor, and utilization of a wrong physical address due to a bug in the address translation structures. The executable may be small when compared to an executable retaining an explicit representation of the same address translation structures. Instead, in accordance with some exemplary embodiments of the disclosed subject matter, the executable may retain an expandable address translation structure that can be expanded on the fly to provide a plurality of address translation structures to be utilized during the execution of the tests. Such limited size may be of importance in post-silicon verification where available memory may be limited in a significant manner.

Yet another technical effect of utilizing the disclosed subject matter is to stress test an MMU. In some exemplary embodiments, using the same address translation structure as a base for all other address translation structures may enable users to freely and quickly switch between contexts during test execution, and by that stress the MMU and its underlying micro-architecture structures.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

It is noted that the disclosed subject matter may be applicable with respect to any address translations. For example, in some processor architectures, the processor may utilize effective addresses, which may be translated into intermediate addresses, which in turn may be translated into real addresses. The disclosed subject matter may be utilized to verify correct translation of effective addresses to intermediate addresses, intermediate addresses to physical addresses, and effective addresses to physical addresses, e.g., such as in processors that implement Effective to Real Address Translation (ERAT). Without loss of generality and for the clarity of the present disclosure, the disclosed subject matter is described in relation to a virtual address that is mapped to a physical address. The virtual address may be any address that is utilized (directly or indirectly) in an instruction to the processor which is mapped to a physical address. The physical address may be any address that is utilized (directly or indirectly) by the processor to access memory.

Figure 1:
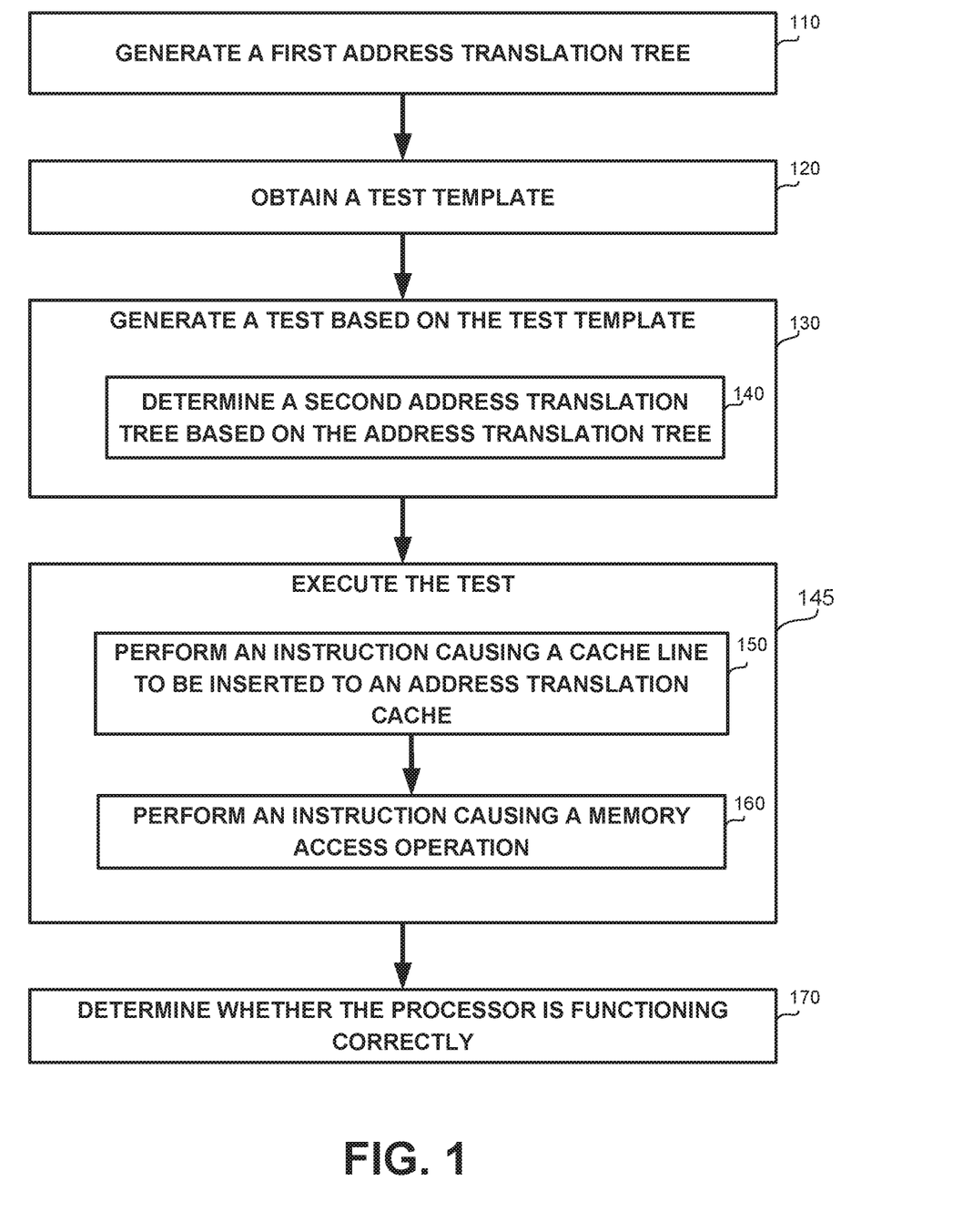
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the disclosed subject matter.

On Step 110, a first address translation structure may be generated. The first address translation structure may comprise a first top level and a sub translation structure. The first top level may be connected to the sub-structure, such as using one or more pointers pointing to the one or more addresses of the sub-structure. Additionally or alternatively, the first address translation structure may comprise multiple levels, each of which may comprise a plurality of entries. Each entry in the plurality of entries may point to a next level. Each entry may comprise at least one pointer pointing to a next level. Additionally or alternatively, each pointer may comprise a value. The value may be an address of a next level in the first address translation structure. In some exemplary embodiments, the first address translation structure may be utilized by a target processor to translate a virtual address to a physical address. Additionally or alternatively, the first address translation structure may be utilized by a target processor to translate a virtual address to a physical address in a first context.

In some exemplary embodiments, the first address translation structure may be generated by a computerized device in order to execute a test thereon. The first address translation structure may be embedded in an executable configured to execute the test, such as in case of post-silicon verification. Additionally or alternatively, the generation may be performed and utilized off-platform, such as in case of pre-silicon verification.

In some exemplary embodiments, generating the first address translation structure may comprise utilizing a solution of a CSP. The CSP may define a set of variables, a set of constraints thereon, and a set of domains for each variable. A CSP solver may be utilized to provide a solution to the CSP. The solution of the CSP may define, at least a portion of the first address translation structure. In some exemplary embodiments, a plurality of alternative solutions to the CSP may be provided, and accordingly, a plurality of alternative first address translation structures may be generated. It is noted that in some embodiments, the first address translation structure may be generated without the use of a CSP solver and using other methods, such as retaining observed address translation structures, manually defining the address translation structure, or the like.

It is noted that in some embodiments, the address translation structure may be generated in a different device, e.g., a server, an off-platform device, or the like, and retrieved therefrom before execution. In some cases, the generation may be performed by a different entity than the entity performing the verification.

On Step 120, a test template may be obtained. In some exemplary embodiments, the test template may be defined by a verification engineer. The test template may define a scenario to be tested by the target processor. The test template may introduce one or more degrees of freedom for defining a concrete test that follows the scenario defined therein. In some exemplary embodiments, the test template may comprise one or more directives. Each directive may define constraints on the scenario. As an example, a directive may indicate that an instruction is to be created. The directive may indicate the type of instruction or may provide a set of types of instructions from which the instruction is to be selected. The directive may indicate values, such as a constant value, a value defined on other values (e.g., defined using variables), a range of values from which the value is selected, or the like. In some exemplary embodiments, the directive may be configured to be processed by a test generator, which may generate tests that implement the scenario defined therein.

In some exemplary embodiments, a test template in accordance with the disclosed subject matter may define a constraint on the number of contexts to be generated, yielding the number of times (e.g., the number of contexts minus one) that the first address translation structure should be duplicated. Additionally or alternatively, the test template may define a manner by which the first address translation structure is to be duplicated. As an example, the manner may be as exemplified by FIG. 3A or as exemplified in FIG. 3B. Additionally or alternatively, the test template may define degrees of freedom in the duplication, such as enabling modifications of some aspects of the address translation structure, such as modifying a single physical address, modifying a set of physical addresses, modifying one or more virtual addresses, modifying permissions, or the like. Additionally or alternatively, the test template may define a size of an address translation structure, a size of an address translation cache to be tested, or the like.

On Step 130, a test may be generated based on the test template. In some exemplary embodiments, the generated test may comprise a plurality of instructions based on the test template. Generating the test may comprise performing Step 140. Additionally or alternatively, Step 140 may be performed by a device different than the target processor, and its outcome may be utilized by the target processor, a simulation thereof, or the like.

On Step 140, a second address translation structure may be determined based on the first address translation structure. The second address translation structure may comprise a second top level. The second top level may be defined to be connected to the sub translation structure of the first address translation structure. In some exemplary embodiments, the second top level may be determined based on the first address translation structure. The second top level may be determined by duplicating the first top level. Additionally or alternatively, the second top level may be determined by duplicating pointers comprised by the first top level. In some exemplary embodiments, the second address translation structure may be an exact replica of the first address translation structure. Additionally or alternatively, the second address translation structure may be generated as a replica that is modified, potentially by a small number of changes, such as about 5 changes, about 10 changes, about 50 changes, or the like. It is noted that a limited number of changes may be of importance in order to allow for identification of debuggable bugs. A bug that is too complex to understand its underlying reason may be hard to debug and may not be useful if identified during verification, as the underlying reason thereof may be hard to identify and solve.

In some exemplary embodiments, the second address translation structure may be utilized by a computerized device in order to translate a virtual address to a physical address in a second context during execution of the test.

In some exemplary embodiments, Step 140 may be repeated a plurality of times to create a multiplicity of address translation structures based on the translation structure generated in Step 110 (or otherwise obtained).

On Step 145, a test may be executed. The test may be executed in order to verify a functionality of a target processor. In some cases, the test may be executed by the target processor. Additionally or alternatively, the test may be executed by a simulator, emulator, accelerator, or another device that simulates the functionality of the target processor, such as in case of pre-silicon verification.

In some exemplary embodiments, the test may be configured to verify that the target processor is properly utilizing an address translation cache. In some exemplary embodiments, a user may define proper utilization of an address translation cache, and the test template may be defined to verify the functionality.

In some exemplary embodiments, it may be desired to fill the address translation cache in order to verify that the target processor is properly utilizing the address translation cache, to stress-test the cache mechanism, or the like. An operation comprising a virtual address may yield searching for the virtual address in the address translation cache. In case that the virtual address was not found (cache miss), the physical address may be computed based on an address translation structure and the virtual address. After the physical address is computed, the cache may be updated and a line comprising the virtual address and the associated physical address may be inserted to the address translation cache. In case that the cache is full, another line should be removed from the cache. Additionally or alternatively, if the virtual address is found (cache hit), the address may be utilized without re-computation thereof based on the address translation structure.

On Step 150, instruction causing a cache line to be inserted to an address translation cache may be performed. As an example, the instruction may be load/store instruction, and as a side effect, the cache line may be inserted to the address translation cache. Each line in the address translation cache may comprise a key and a value. The key may be a virtual address, a virtual address and a context ID, or the like. The value may be a physical address. In some exemplary embodiments, the address translation cache may cache frequently used addresses in order to save accessing time to the main memory or the like. In some exemplary embodiments, the instruction may be an instruction that is configured to or is estimated to result in a cache miss.

In some exemplary embodiments, Step 150 may be performed a plurality of times in order to fill the address translation cache. An address translation cache may be associated with a functionality. The functionality may define how to handle inserting a line to the cache, removing a line from the cache, or the like. Additionally or alternatively, in case that the cache is full and a new line should be inserted to the cache, the functionality may define which line should be removed from the cache in order to free space for the line that should be inserted. Hence, it may be desired to test the cache when it is full.

On Step 160, an instruction causing a memory access operation may be performed. In some cases, the instruction may be load, store, or the like, causing the target processor to read or to write a value to or from, respectively, a physical location. More specifically, the load/store operation may take a virtual address as an argument. Additionally or alternatively, the load or store operation may be performed within a specific context. The processor may be configured to fetch a physical address from the address translation cache based on the argument and based on the current context. In case that the physical address was fetched, the load/store operation may resume. Additionally or alternatively, in case of a cache miss, the target processor may be configured to compute the physical address from the address translation structure of the current context.

In some exemplary embodiments, other instructions that utilize virtual addresses, such as control flow instructions, instructions relying on virtual addresses, or the like, may be performed.

On Step 170, it may be determined whether the processor is functioning correctly. In some exemplary embodiments, excepted results may be embedded in the test template. An outcome of the test of Step 145 may be obtained and compared against the excepted results.

Figure 2:
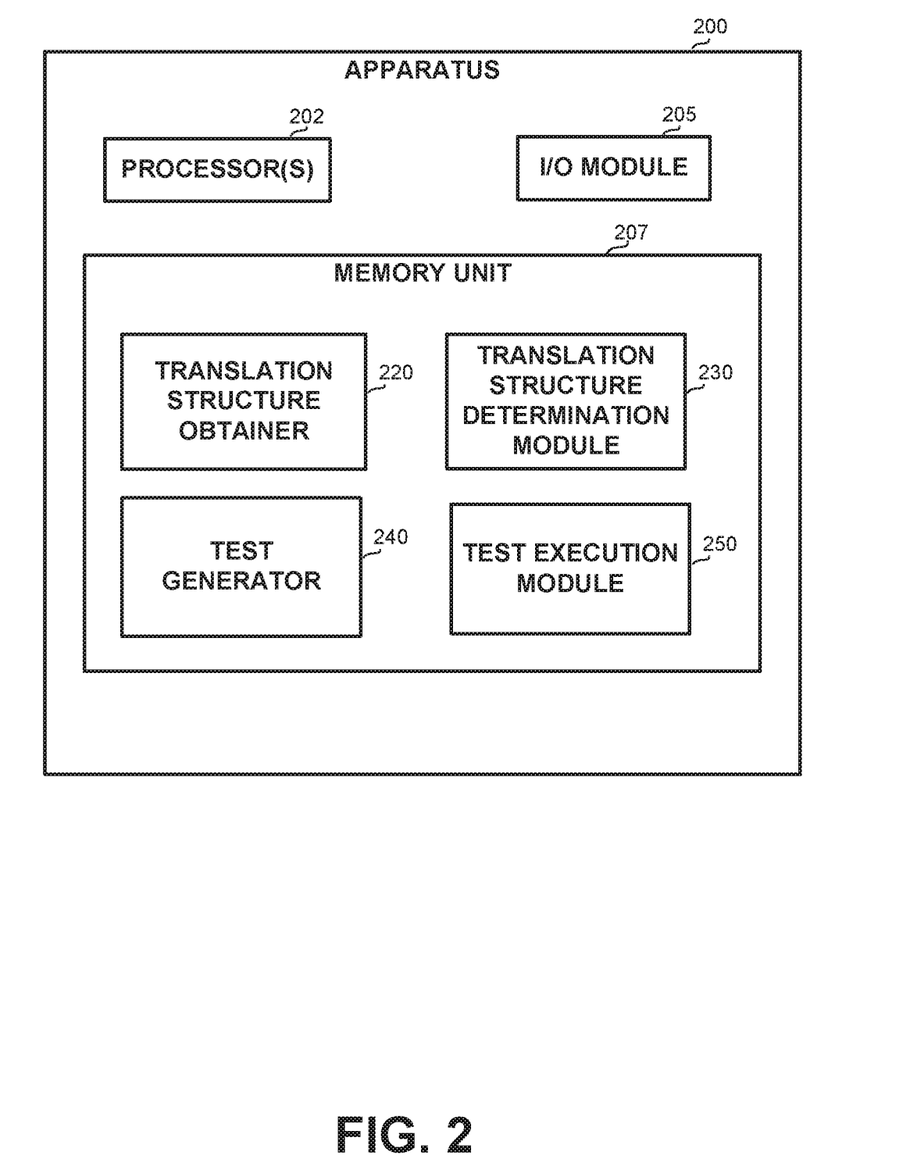
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter. The apparatus of FIG. 2 may illustrate an apparatus of the disclosed subject matter in a pre-silicon environment.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of its subcomponents.

In some exemplary embodiments, Processor 202 may be of a different model than the target processor, of a different brand than the target processor, have a different architecture than the target processor, or the like. Additionally, or alternatively, Processor 202 may be the target processor.

In some exemplary embodiments of the disclosed subject matter, Apparatus 200 may comprise an Input/Output (I/O) Module 205. I/O Module 205 may be utilized to provide an output to and receive input such as, for example obtain a test template from an external database, obtain a first address translation structure from a verification engineer, save outcomes of tests simulation to an external database, display results to a user, or the like.

In some exemplary embodiments, Apparatus 200 may comprise Memory Unit 207. Memory Unit 207 may be a hard disk drive, a Flash disk, a Random Access Memory (RAM), a memory chip, or the like. In some exemplary embodiments, Memory Unit 207 may retain program code operative to cause Processor 202 to perform acts associated with any of the subcomponents of Apparatus 200. Memory Unit 207 may comprise one or more components as detailed below, implemented as executables, libraries, static libraries, functions, or any other executable components.

In some exemplary embodiments, Translation Structure Obtainer 220 may be configured to obtain an address translation structure. The address translation structure obtained by Translation Structure Obtainer 220 may be a first address translation structure with accordance to the disclosed subject matter. Additionally or alternatively, the address translation structure obtained by Translation Structure Obtainer 220 may be expandable by Translation Structure Determination Module 230 to a plurality of address translation structures. In some exemplary embodiments, obtaining the first address translation structure may comprise using a solution of a CSP, solved by a CSP solver (not shown).

In some exemplary embodiments, Translation Structure Determination Module 230 may be configured to determine a second address translation structure, based on the first address translation structure. Determining the second address translation structure may comprise duplicating a first top level comprised by the first address translation structure.

In some exemplary embodiments, duplicating the first address translation structure may be performed prior to executing Test Generator 240. In that embodiment, the first translation structure and the second translation structure may be utilized a plurality of times by Test Generator 240 and Test Execution Module 250 in order to execute a plurality of tests. Determining the first translation structure and the second translation structure prior to generating a test may yield better performances compared to determining the second translation structure per each test.

Additionally or alternatively, duplicating the first address translation structure may be performed in run time. Test Execution Module 250 may utilize Structure Determination Module 230 while a test is being executed. In some exemplary embodiments, such run time duplication may be useful for rapidly generating a new context.

In some exemplary embodiments, having more than one context may be useful in verifying the operation of the target processor, when performing context changes. As an example, the target processor may be instructed, in a first context, to access a first virtual address that is mapped in the first context to a physical address. The target processor may then be instructed, in a second context, to access a second virtual address that is mapped in the second context to the same physical address. As the target processor should access the same physical address, the content in the accessed memory may be verified to be the same in both contexts. As yet another example, the target processor may be instructed, in a first context, to access a virtual address that is mapped in the first context to a first physical address. The target processor may then be instructed, in a second context, to access the same virtual address. As the same virtual address is mapped in the second context to a different physical address, it may be verified that a different content is accessed.

In some exemplary embodiments, Tests Generator 240 may be configured to generate tests based on the test template, e.g., as described in FIG. 1, Step 130.

In some exemplary embodiments, Tests Execution Module 250 may be configured to execute a test by the target processor as described in FIG. 1, Step 145. Additionally or alternatively, Test Execution Module 250 may utilize an executable, generated based on the test template. In some exemplary embodiments, the executable may comprise instructions that when executed by the target processor, a new context may be created. Creating the new context may comprise utilizing Structure Determination Module 230. Structure Determination Module 230 may provide an address translation structure to be utilize by the target processor while translating a virtual address to physical address in the new context.

Figure 3A:
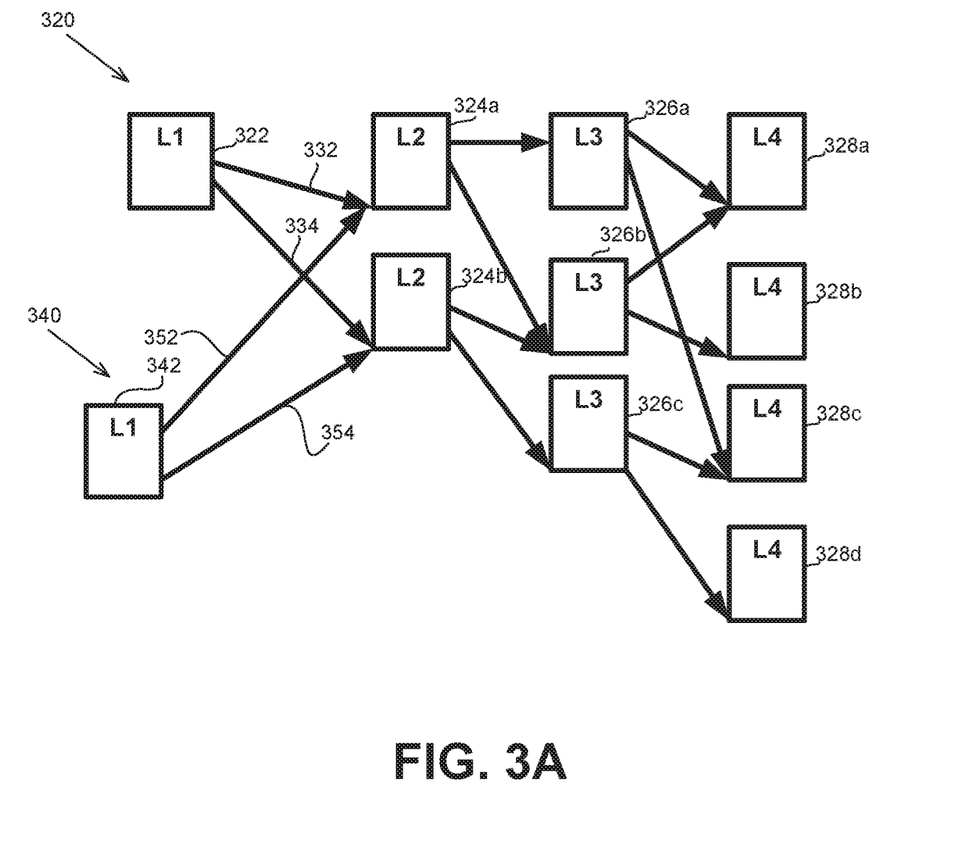
FIGS. 3A and 3B illustrate address translation structures, in accordance with some exemplary embodiments of the disclosed subject matter.

Referring now to FIG. 3A showing a schematic illustration of an exemplary address translation structures, in accordance with some exemplary embodiments of the disclosed subject matter.

FIG. 3A may illustrate two address translation structures. Address Translation Structure 320 may comprise Top Level 322, also denoted as L1 level. Additionally or alternatively, Address Translation Structure 320 may comprise a second level (L2) comprising Level 324a and Level 324b. Additionally or alternatively, Address Translation Structure 320 may comprise a third level (L3) comprising Level 326a, Level 326b and Level 326c. Additionally or alternatively, Address Translation Structure 320 may comprise a fourth level L4) comprising Level 328a, Level 328b, Level 328c, Level 328d. In some exemplary embodiments, each level, including Top Level 322, may comprise one or more entries, each of which pointing to a next level construct. In some exemplary embodiments, Address Translation Structure 320 may be utilized by a target processor to translate a virtual address to a physical address in a first context.

Address Translation Structure 340 may be generated, determined, or the like, based on Address Translation Structure 320. In the illustrated embodiment, Top Level 322 (L1) may be duplicated to form Top Level 342 of Address Translation Structure 340. Duplicating Top Level 322 may comprise duplicating each pointer in Top Level 322 and its value, to be included in Top Level 342. For example, Pointer 332, pointing to L2 table 324a is duplicated and represented by Pointer 352, which is similarly pointing to L2 table 324a. Duplicating Pointer 332 may comprise copying the address of Level 324a to Pointer 352. Pointer 352 may point from an entry in Top Level 342 to Level 324a. Similarly, Pointer 334 is duplicated by Pointer 354. Pointer 334 may point from an entry comprised by Top Level 322 to Level 324b. Pointer 334 may comprise, as a value, the address of Level 324. Duplicating Pointer 334 may comprise adding Pointer 354 to Top Level 342. Pointer 354 may be configured to point from an entry comprised by Top Level 342 to Level 324b of Address Translation Structure 320. Duplicating Pointer 334 may comprise copying a value of Pointer 334 and assigning the value to Pointer 354. The value may be the address of Level 324b.

In some exemplary embodiments, Address Translation Structure 340 may be utilized by the target processor for translating virtual addresses in a second context. In some exemplary embodiments, Address Translation Structure 340 may translate virtual addresses that are translatable by Address Translation Structure 320. Additionally or alternatively, Address Translation Structure 340 may be further modified to change the virtual addresses that are translatable thereby, the permissions or other attributes of the addresses, or the like.

In some exemplary embodiments, while verifying a target processor, and in order to rapidly generate a new context, the disclosed subject matter may be utilized. Address Translation Structure 320 may be static data as exemplified by Translation Structure 434 of FIG. 4. Address Translation Structure 340 may be non-static and may be generated as exemplified in Step 445 of FIG. 4, which may be performed prior to test generation, during test generation or after test generation.

In some exemplary embodiments, the illustration of FIG. 3A may be utilized in architectures where two address translation structures cannot share the same L1 table, and therefore Top Level (L1) 322 is replicated and another copy thereof is created to be used in Address Translation Structure 340, Top Level (L1) 342.

Figure 3B:
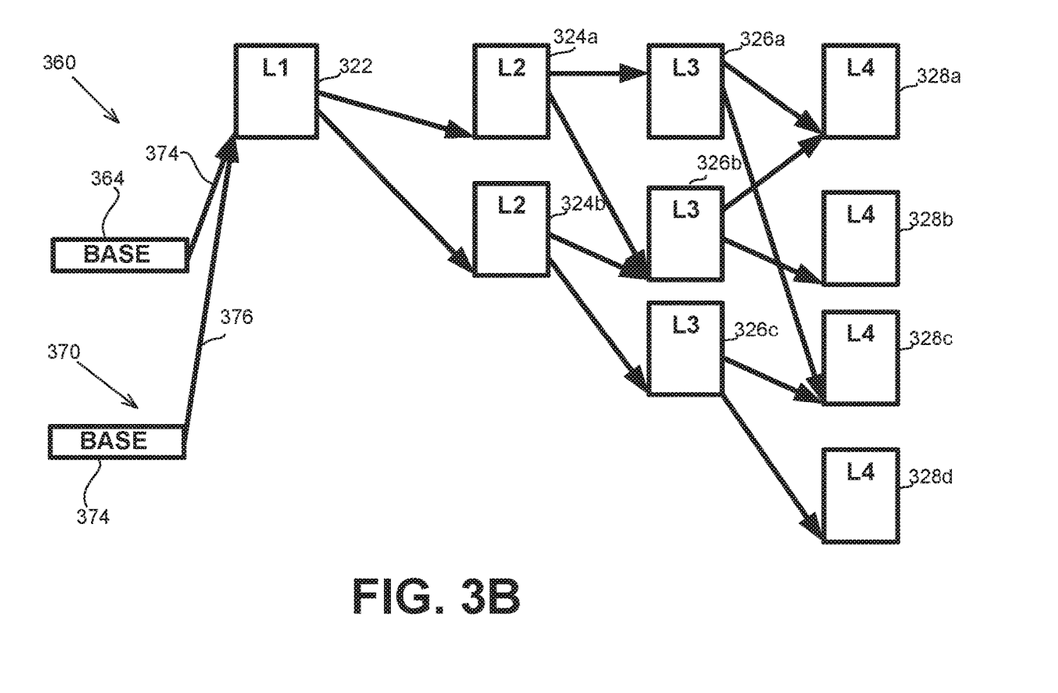

Referring now to FIG. 3B showing a schematic illustration of an exemplary address translation structures, in accordance with some exemplary embodiments of the disclosed subject matter. FIG. 3B may illustrate a different manner of duplicating an address translation structure based on an original structure, Address Translation Structure 360.

In some exemplary embodiments, the processor architecture may allow two different address translation structures to point to a same L1 structure. A base pointer may be a single pointer pointing to the L1 table of the address translation structure. The base pointer may be retained in other data structures, such as but not limited to an array of pointers, each of which pointing to the structure of a different context, where the array is indexed using the identifiers of the contexts. Base 364 may consist a single pointer, Pointer 374, and point to Top Level (L1) 322.

Address Translation Structure 370 may illustrate a duplication of Address Translation Structure 360. Address Translation Structure 370 may comprise Base 374. Base 374 may consist of a single pointer, Pointer 376. Pointer 376 may point to Top Level (L1) 322. Determining Address Translation Structure 370 base on Address Translation Structure 360 may comprise setting Pointer 376 to have the value of Pointer 374.

Figure 4:
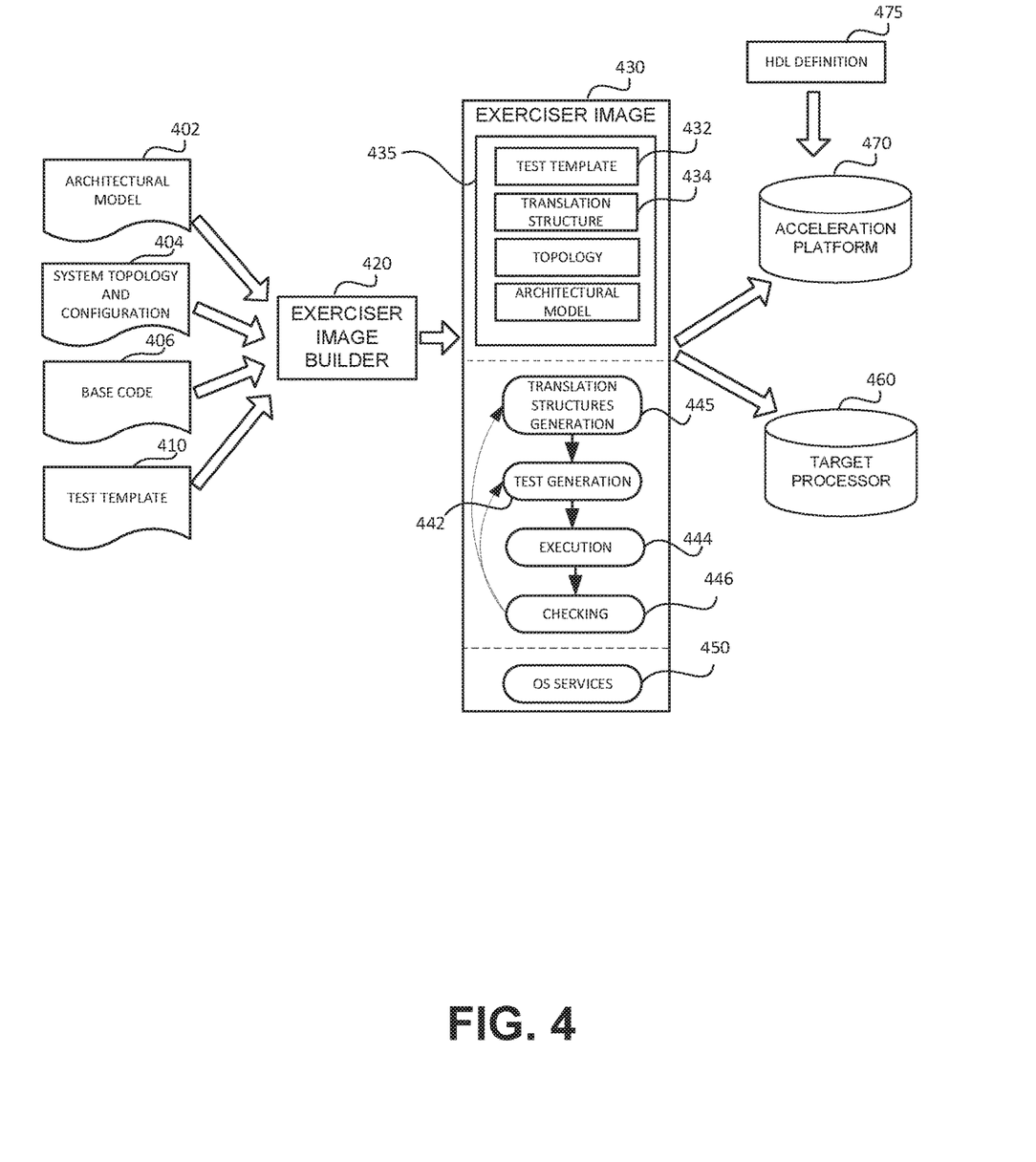
FIG. 4 illustrates a schematic illustration of an exemplary environment and architecture in which the disclosed subject matter may be utilized, in accordance with some exemplary embodiments of the disclosed subject matter.

Referring now to FIG. 4, showing an illustration of a computerized environments in accordance with some exemplary embodiments of the disclosed subject matter. FIG. 4 may illustrate a post-silicon verification scenario.

An Exerciser Image Builder 420 may be configured to generate an Exerciser Image 430. Exerciser Image Builder 420 may be a computerized tool, such as implemented in hardware, software, a combination thereof, or the like. Exerciser Image Builder 420 may be configured to take different inputs as data which based thereon Exerciser Image 420 may be built.

In some exemplary embodiments, Architectural Model 402 may be provided as input, and portions thereof may be inserted to a Data Section 435 of Exerciser Image 430. Architectural model 402 may be utilized by Exerciser Image 420 to generate test cases that invoke different architectural aspects of the target device. Additionally or alternatively, System Topology and Configuration 404 may be provided as input and portions thereof may be retained in Data Section 435. Topology and configuration information may be utilized by Exerciser Image 430 to generate test cases that test different aspects of the topology and configuration of the target device. Additionally or alternatively, Base Code 406 may be provided as input. Base Code 406 may comprise program instructions to be added to Exerciser Image 430. In some exemplary embodiments, Exerciser Image 430 may be based on Base Code 406. The program instructions may be operative to perform generation-execution-checking loop (442, 444, 445, 446). Additionally or alternatively, Base Code 406 may comprise program instruction providing OS services, such as OS Services 450. Additionally or alternatively, Test Template 410 or a plurality of similar templates may be provided as input and may be retained in Data Section 435 to allow Exerciser Image 430 to perform generation based upon abstract outline of operations provided by the Test Template 410. In some exemplary embodiments, Test Template 410 may be modified and a Test Template 432 may be included in Data Section 435 instead or in addition to the original Test Template 410.

In some exemplary embodiments, Exerciser Image Builder 420 may be configured to manipulate any input provided to it before storing corresponding data in Data Section 435. In one embodiment, Exerciser Image Builder 430 may strip down information that is not needed by the Exerciser Image 420 and/or may pre-calculate information to reduce amount of data to be retained in the binary image.

In some exemplary embodiments, Exerciser Image Builder 420 may pre-calculate Translation Structure 434. In some exemplary embodiments, Translation Structure 434 may be calculated using a CSP solver (not shown), and computed while taking into account the directives of Test Template 410. However, during execution, additional translation structures may be generated and utilized.

In some exemplary embodiments, Exerciser Image 430 may comprise Data Section 435 that may retain useful information such as test template based upon generation may be performed (e.g., 410 or 432), Translation Structure 434, topology and configuration information, architectural model information or the like.

In some exemplary embodiments, Exerciser Image 430 may comprise program instructions designed to cause the Target Processor 460 to repeatedly perform generation of a test case (442), execution of the test case (444) and checking results of executing the test case (446). In some exemplary embodiments, prior to commencement of Execution 444, Translation Structures Generation 445 may be performed. Additionally or alternatively, Translation Structures Generation 445 may be part of Test Generation 442. In some exemplary embodiments, checking operations (446) may be based on consistency checks. As an example, the same test case may be executed a plurality of times, and the results may be compared for consistency.

In some exemplary embodiments, a test may comprise a plurality of test instances. In that case, the test may define a scenario and each test instance may be configured to test the scenario with different values. As an example, the test may comprise storing a number of values to a number of different memory locations. A first test instance may be executed and 10 values may be stored in 10 memory locations. A second test instance may be executed and 5 values may be written to 5 memory locations.

In some exemplary embodiments, Structures Generation 445 may be comprised by Test Generation 442. In that embodiment, during the generation of the test, all the address translation structures required by the test may be generated, Exerciser Image 430 may comprise OS Services 450, an Additional Software Layer (ASL), useful for providing the Exerciser Image 430 with functionality that is not provided by a bare-metal product, such as Target Processor 460. OS Services 450 may provide functionalities such as interrupt handlers, program counter or instruction pointer manipulation, software-based context switch, or the like.

Exerciser Image 430 may be loaded onto a platform, such as Target Processor 460. Exerciser Image 430 may be loaded by loading the binary to a memory unit of Target Processor 460. Exerciser Image 430 may be executed by the Target Processor 460 and may cause Target Processor 460 to generate tests, execute and check their execution results, thereby enabling verification of the Target Processor 460.

Exerciser Image 430 may be alternatively loaded to an Acceleration Platform 470 which simulates, in a hardware-based manner, Target Processor 460. Acceleration Platform 470 may be configured to simulate operation of a circuit design based upon an HDL definition thereof (475), such as the HDL from which Target Processor 460 is fabricated.

Figure 5:
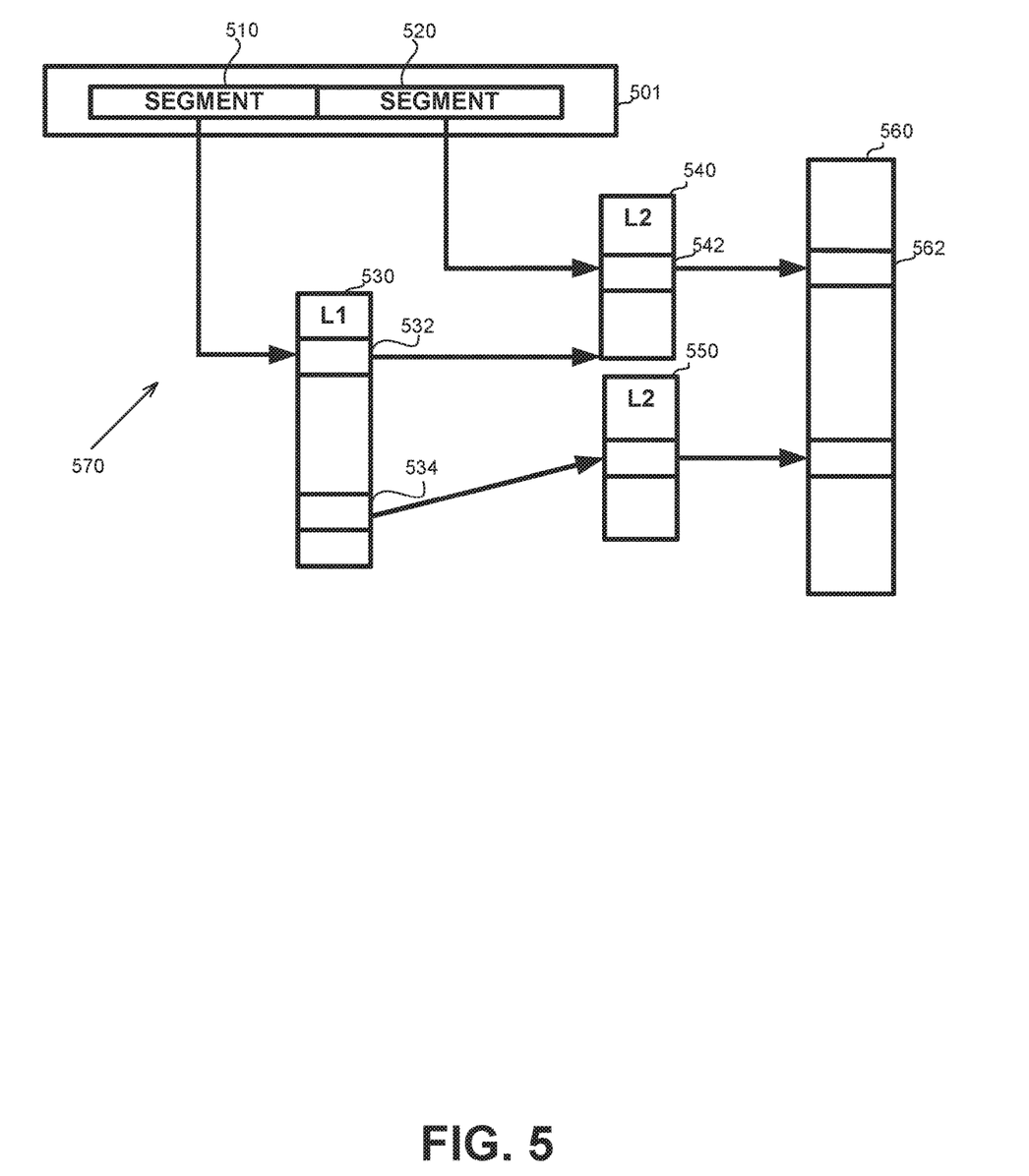
FIG. 5 illustrates a schematic illustration of translation of a virtual address to a physical address, in accordance with some exemplary embodiments of the disclosed subject matter.

Referring now to FIG. 5 showing translation of a virtual address to a physical address in accordance to the disclosed subject matter.

Virtual Address 501 may comprise Segment 510 and Segment 520. Each segment may define an offset in an address translation tree. It is noted that the address may be segmented into any number of segments, and the two-segment example is provided for illustration purposes only.

Address Translation Tree 570 may comprise two levels. The first level (L1) may comprise L1 Table 530. L1 Table 530 may comprise a plurality of entries pointing to second level tables (L2), such as Entry 532 and Entry 534. The second level may comprise L2 Table 540 and L2 Table 550. Each of the L2 Tables may comprise entries, such as Entry 542, pointing to Memory 560. Memory 560 may comprise blocks, such as Block 562. The address of Block 562 may be considered the physical address, and may be retained by the corresponding L2 Table.

In translating Virtual Address 501 to Physical Address of Block 562, a path in Address Translation Tree 570 is computed. The base address of L1 Table 530 is fetched. Segment 510 defines an offset from the base address of L1 Table 530. In this example, Segment 510 offsets the base pointer to point to Entry 532 as is schematically illustrated. Entry 532 may point to the base address of L2 Table 540. Segment 520 may define an offset from the base address of the second level. The offset may be defined regardless of which L2 table is being accessed. Hence, a modification in Segment 510 may cause the address to relate to L2 Table 550, and would cause a different translation although the offset defined by Segment 520 may remain unchanged. Segment 520 may define an offset leading to Entry 542 in L2 Table 540. Entry 542 may point to the physical location represented by Virtual Address 501. Hence, the address in Entry 542 may be the physical address. As can be appreciated, translating a virtual address to a physical address may require several operations. The number of operations increases with the increase in number of levels in the translation tree. The virtual address defines a single path in the translation tree, which provides the physical address. Hence, utilization of cache mechanisms improves performance if address translation is re-used and re-calculation is avoided when possible.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    testing on address translation cache of a target processor, wherein the address translation cache is configured to fetch physical addresses for virtual addresses, wherein said testing comprises executing a test by the target processor, wherein the test is configured to verify an operation of the address translation cache of the target processor in case of a cache miss, wherein the address translation cache is configured to retrieve, in case of a cache miss, one or more physical addresses based on an address translation structure that corresponds to a context, wherein said testing comprises:
        obtaining a first address translation structure, wherein the first address translation structure comprises multiple levels, each of which comprising one or more entries that point to a next level in the first address translation structure, wherein the multiple levels comprises a first top level which connects to a sub-structure of the first address translation structure using pointers thereto, wherein the first address translation structure enables translation of virtual addresses to physical addresses in a first context;
        determining, based on the first address translation structure, a second address translation structure, wherein the second address translation structure comprises a second top level that is determined based on the first top level, wherein the second top level connects to the sub-structure of the first address translation structure, wherein the second address translation structure enables translation of virtual addresses to physical addresses in a second context;
        adding a first cache line to the address translation cache, wherein the first cache line indicates a translation of a virtual address in the first context to a first physical address;
        obtaining a memory access instruction of the test, wherein the memory access instruction is configured to cause the target processor to translate the virtual address in the second context to a second physical address;
        detecting a cache miss event, wherein the cache miss event indicates that a translation for the virtual address in the second context is not found within the address translation cache;
        determining the second physical address based on a translation of the second address translation structure, wherein the translation translates the virtual address to the second physical address;
        determining a second cache line to be included in the address translation cache, wherein the second cache line indicates the virtual address, the second context, and the second physical address; and
        verifying that the address translation cache operates properly based on the second cache line.

2. The method of claim 1, wherein the pointers comprise a plurality of pointers, each of which pointing to a next level table of addresses, wherein the plurality of pointers connect to the sub-structure of the first address translation structure, wherein said determining the second address translation structure comprises:
    duplicating the first top level to obtain the second top level, wherein the second top level comprising a second plurality of pointers, wherein said duplicating comprises assigning values to each of the second plurality of pointers, based on the plurality of pointers of the first top level, whereby connecting the sub-structure of the first address translation table to the second address translation table.

3. The method of claim 1, wherein the first top level consists of a single pointer comprising an address of the sub-structure of the first address translation structure, wherein the second top level consists of another single pointer, wherein said determining comprises setting the another single pointer of the second top level to point to the address of the sub-structure of the first address translation structure.

4. The method of claim 1, wherein the first address translation structure is associated with a first set of permission attributes; wherein said determining the second address translation structure comprises determining a second set of permission attributes for the second address translation structure, wherein the second set of permission attributes is determined to be different than the first set of permission attributes by at least one attribute relating to the virtual address, wherein said executing the test comprises performing a first instruction using the first address translation structure to the virtual address and performing a second instruction using the second address translation structure to the virtual address, wherein the second instruction comprises the memory access instruction.

5. The method of claim 1, wherein said obtaining the first address translation structure comprises: determining the first address translation structure using a solution of a Constraint Satisfaction Problem (CSP), wherein the CSP is solved by a CSP solver, wherein the CSP solver is not utilized for determining the second address translation structure.

6. The method of claim 1 further comprises:
loading onto a memory utilized by the target processor an executable computer program product, wherein the executable computer program product comprises the test and the first address translation structure;
wherein said determining the second address translation structure performed by execution of the executable computer program product, whereby the executable computer program product providing an expandable representation of the first address translation structure.

7. The method of claim 1, wherein said verifying comprises verifying that the address translation cache includes the second cache line, and that the second cache line has accurate values of the virtual address, the second context, and the second physical address.

8. A computerized apparatus having a processor and coupled memory, the processor being adapted to perform the steps of:
testing an address translation cache of a target processor, whereto the address translation cache is configured to fetch physical addresses for virtual addresses, wherein said testing comprises executing a test by the target processor, wherein the test is configured to verily an operation of the address translation cache of the target processor in case of a cache miss, wherein the address translation cache is configured to retrieve, in case of a cache miss, one or more physical addresses based on an address translation structure that corresponds to a context, wherein said testing comprises:
obtaining a first address translation structure, wherein the first address translation structure comprises multiple levels, each of which comprising one or more entries that point to a next level in the first address translation structure, wherein the multiple levels comprises a first top level which connects to a sub-structure of the first address translation structure using pointers thereto, wherein the first address translation structure enables translation of virtual addresses to physical addresses in a first contest;
determining, based on the first address translation structure, a second address translation structure, wherein the second address translation structure comprises a second top level that is determined based on the first top level, wherein the second top level connects to the sub-structure of the first address translation structure, wherein the second address translation structure enables translation of virtual addresses to physical addresses in a second context;
adding a first cache line to the address translation cache, wherein the first cache line indicates a translation of u virtual address in the first contest to a first physical address;
obtaining a memory access instruction of the test, wherein the memory access instruction is configured to cause the target processor to translate the virtual address in the second contest to a second physical address;
detecting a cache miss event, wherein the cache miss event indicates that a translation for the virtual address in the second context is not found within the address translation cache;
determining the second physical address based on a translation of the second address translation structure, wherein the translation translates the virtual address to the second physical address;
determining a second cache line to be included in the address translation cache, wherein the second cache line indicates the virtual address, the second context, and the second physical address; and
verifying that the address translation cache operates properly based on the second cache line.

9. The computerized apparatus of claim 8, wherein the pointers comprise a plurality of pointers, each of which pointing to a next level table of addresses, wherein the plurality of pointers connect to the sub-structure of the first address translation structure, wherein said determining the second address translation structure comprises:
duplicating the first top level to obtain the second top level, wherein the second top level comprising a second plurality of pointers, wherein said duplicating comprises assigning values to each of the second plurality of pointers, based on the plurality of pointers of the first top level, whereby connecting the sub-structure of the first address translation table to the second address translation table.

10. The computerized apparatus of claim 8, wherein the first top level consists of a single pointer comprising an address of the sub-structure of the first address translation structure, wherein the second top level consists of another single pointer, wherein said determining comprises setting the another single pointer of the second top level to point to the address of the sub-structure of the first address translation structure.

11. The computerized apparatus of claim 8, wherein the first address translation structure is associated with a first set of permission attributes; wherein said determining the second address translation structure comprises determining a second set of permission attributes for the second address translation structure, wherein the second set of permission attributes is determined to be different than the first set of permission attributes by at least one attribute relating to the virtual address, wherein said executing the test comprises performing a first instruction using the first address translation structure to the virtual address and performing a second instruction using the second address translation structure to the virtual address, wherein the second instruction comprises the memory access instruction.

12. The computerized apparatus of claim 8, wherein said obtaining the first address translation structure comprises: determining the first address translation structure using a solution of a Constraint Satisfaction Problem (CSP), wherein the CSP is solved by a CSP solver, wherein the CSP solver is not utilized for determining the second address translation structure.

13. The computerized apparatus of claim 8, wherein said processor being further adapted to perform:
   loading onto a memory utilized by the target processor an executable computer program product, wherein the executable computer program product comprises the test and the first address translation structure;
   wherein said determining the second address translation structure is performed by execution of the executable computer program product, whereby the executable computer program product providing an expandable representation of the first address translation structure.

14. The computerized apparatus of claim 8, wherein said verifying comprises verifying that the address translation cache includes the second cache line, and that, the second cache line has accurate values of the virtual address, the second context, and the second physical address.

15. A non-transitory computer readable medium retaining program instructions, which program instructions when read by a processor, cause the processor to perform a method comprising:
   testing an address translation cache of a larger processor, wherein the address translation cache is configured to fetch physical addresses for virtual addresses, wherein said testing comprises executing a test by the target processor, wherein the test is configured to verify an operation of the address translation cache of the target processor in case of a cache miss, wherein the address translation cache is configured to retrieve, in case of a cache miss, one or more physical addresses based on an address translation structure that corresponds to a context, wherein said testing comprises:
      obtaining a first address translation structure, wherein the first address translation structure comprises multiple levels, each of which comprising one or more entries that point to a next level in the first address translation structure, wherein the multiple levels comprises a first top level which connects to a sub-structure of the first address translation structure using pointers thereto, wherein the first address translation structure enables translation of virtual addresses to physical addresses in a first context;
      determining, based on the first address translation structure, a second address translation structure, wherein the second address translation structure comprises a second top level that is determined based on the first top level, wherein the second top level connects to the sub-structure of the first address translation structure, wherein the second address translation structure enables translation of virtual addresses to physical addresses in a second context;
      adding a first cache line to the address translation cache, wherein the first cache line indicates a translation of a virtual address in the first context to a first physical address;
      obtaining a memory access instruction of the test, wherein the memory access instruction is configured to cause the target processor to translate the virtual address in the second context to a second physical address;
      detecting a cache miss event, wherein the cache miss event indicates that a translation for the virtual address in the second context is not found within the address transition cache;
      determining the second physical address based on a translation of the second address translation structure, wherein the translation translates the virtual address to the second physical address;
      determining a second cache line to be included in the address translation cache, wherein the second cache line indicates the virtual address, the second context, and the second physical address; and
      verifying that the address translation cache operates properly based on the second cache.

16. The non-transitory computer readable medium of claim 15, wherein the pointers comprise a plurality of pointers, each of which pointing to a next level table of addresses, wherein the plurality of pointers connects to the sub-structure of the first address translation structure, wherein said determining the second address translation structure comprises:
   duplicating the first top level to obtain the second top level, wherein the second top level comprising a second plurality of pointers, wherein said duplicating comprises assigning values to each of the second plurality of pointers, based on the plurality of pointers of the first top level, whereby connecting the sub-structure of the first address translation table to the second address translation table.

17. The non-transitory computer readable medium of claim 15, wherein the first top level consists of a single pointer comprising an address of the sub-structure of the first address translation structure, wherein the second top level consists of another single pointer, wherein said determining comprises setting the another single pointer of the second top level to point to the address of the sub-structure of the first address translation structure.

18. The non-transitory computer readable medium of claim 15, wherein the first address translation structure is associated with a first set of permission attributes; wherein said determining the second address translation structure comprises determining a second set of permission attributes for the second address translation structure, wherein the second set of permission attributes is determined to be different than the first set of permission attributes by at least one attribute relating to the virtual address, wherein said executing the test comprises performing a first instruction using the first address translation structure to the virtual address and performing a second instruction using the second address translation structure to the virtual address, wherein the second instruction comprises the memory access instruction.

19. The non-transitory computer readable medium of claim 15, wherein said obtaining the first address translation structure comprises: determining the first address translation structure using a solution of a Constraint Satisfaction Problem (CSP), wherein the CSP is solved by a CSP solver, wherein the CSP solver is not utilized for determining the second address translation structure.

20. The non-transitory computer readable medium of claim 15, wherein said program instructions when read by a processor, further causes the processor to perform: loading onto a memory utilized by the target processor an executable computer program product, wherein the executable computer program product comprises the test and the first address translation structure;
   wherein said determining the second address translation structure is performed by execution of the executable computer program product, whereby the executable computer program product providing an expandable representation of the first address translation structure.

\* \* \* \* \*